(12) United States Patent
Ghodake et al.

(10) Patent No.: US 12,248,817 B2
(45) Date of Patent: Mar. 11, 2025

(54) SYSTEM AND METHOD FOR EFFICIENT DATA COLLECTION BASED ON DATA ACCESS PATTERN FOR REPORTING IN LARGE SCALE MULTI TENANCY ENVIRONMENT

(71) Applicant: EMC IP Holding Company LLC, Hopkinton, MA (US)

(72) Inventors: Ganesh Malhari Ghodake, Pune (IN); Girish Balvantrai Doshi, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 119 days.

(21) Appl. No.: 17/125,541

(22) Filed: Dec. 17, 2020

(65) Prior Publication Data
US 2022/0197707 A1   Jun. 23, 2022

(51) Int. Cl.
*G06F 9/50* (2006.01)
*G06F 11/30* (2006.01)
*G06F 11/34* (2006.01)

(52) U.S. Cl.
CPC .......... *G06F 9/5072* (2013.01); *G06F 9/5077* (2013.01); *G06F 11/3006* (2013.01); *G06F 11/3438* (2013.01)

(58) Field of Classification Search
CPC .. G06F 9/5072; G06F 9/5077; G06F 11/3006; G06F 11/3438
See application file for complete search history.

(56) References Cited

U.S. PATENT DOCUMENTS

| | | | |
|---|---|---|---|
| 10,078,643 B1* | 9/2018 | Lowry | G06F 16/24532 |
| 2015/0106578 A1* | 4/2015 | Warfield | G06F 3/0653 |
| | | | 711/158 |
| 2017/0010830 A1* | 1/2017 | Ishikawa | G06F 12/0897 |
| 2020/0412835 A1* | 12/2020 | Xu | G06F 16/90335 |
| 2021/0311774 A1* | 10/2021 | Wei | G06F 11/3006 |

FOREIGN PATENT DOCUMENTS

| | | |
|---|---|---|
| CN | 109889602 A | 6/2019 |
| EP | 2680145 A2 | 1/2014 |

OTHER PUBLICATIONS

Prodan et al., "A survey and taxonomy of infrastructure as a service and web hosting cloud providers", Grid Computing, 2009 10TH IEEE/ACM International Conference on, IEEE, Piscataway, NJ, USA, Oct. 13, 2009, pp. 17-25.

* cited by examiner

*Primary Examiner* — Sisley N Kim
(74) *Attorney, Agent, or Firm* — Workman Nydegger (57) ABSTRACT

One example method includes collecting information concerning respective data access patterns of one or more customers, using the information, and work window information, to calculate a respective data retrieval frequency for each of the customers, and enabling the customers to retrieve data according to their respective data retrieval frequency. The collected information may be weighted prior to calculation of the data retrieval frequency, and the data retrieval frequency may be updated automatically in response to changes in customer data.

17 Claims, 3 Drawing Sheets

SYSTEM AND METHOD FOR EFFICIENT DATA COLLECTION BASED ON DATA ACCESS PATTERN FOR REPORTING IN LARGE SCALE MULTI TENANCY ENVIRONMENT

FIELD OF THE INVENTION

Embodiments of the present invention generally relate to management of data collection. More particularly, at least some embodiments of the invention relate to systems, hardware, software, computer-readable media, and methods for efficient collection of data based on data access patterns.

BACKGROUND

Typical modern-day software systems, whether on-premise, in cloud or hybrid systems, have monitoring and reporting features. With each passing day, these systems, and their associated monitoring and reporting requirements, are becoming more and more complex.

In many businesses, there is increasing focus on cloud hosted functions, and there are a variety of cloud offerings. The DellEMC Cloud Snapshot Manager (CSM) is one such SaaS offering that enables customer to protect their workloads hosted in public cloud environment such as Amazon AWS and Microsoft Azure. Workloads may include, for example, functions implemented by virtual machines, various data bases, and object storage. Many customers have multiple accounts in these public clouds, and many of the customers also have accounts in more than one public cloud that they protect with CSM or other services.

In the example case of CSM, for example, that platform offers various types of reports to its customers. For some of these reports, CSM may be required to fetch data from a customer account that resides in a public cloud, or in a private cloud, validate the data against a CSM catalog store, and then generate relevant data for reporting. Such reporting might include, for example, reporting how many, and which, customer resources in the cloud are protected by CSM, and how many, and which, customer resources are not protected.

Services such as CSM may be hosted in a public cloud data center, or private cloud datacenter. Data retrieval from public cloud environments typically takes place by way of the internet. Because many such services are SaaS (Software as a Service) offerings, they must cater to the scale, elasticity, and reliability, that are expected of any cloud implemented solution. Moreover, services such as CSM may be required to fetch data for all the tenant accounts in the system. For each account, the service may crawl through each public cloud account configured within that customer account, regions and for each resource types, such as VMs or DBs (databases) for example, during each cycle in a day. The service runs as many cycles possible in a day or other specified time period.

Considerations such as those noted above may present challenges. One such challenge concerns the reporting of real time data. In particular, typical customers want up to date data all the time. This is because the state of the public cloud account of the customer is ever changing. For example, every hour, minute, and second, new instances of resources such as VMs and DBs are being created or existing instances deleted/removed. Unless the customer receives real time reporting, it may be difficult or impossible for the customer to know, at any given time, the state of its cloud account. Thus, the expectation of the customer is that it wants to receiving reporting that is as close as possible to real time reporting. For this to happen however, the service, whether it be CSM and/or one or more other services, must fetch data about the customer account from the public cloud as often as possible. However, completion of even a single data fetch cycle may take a long time, depending upon considerations such as the number of customer accounts involved, and the configuration of those accounts.

While implementation of a parallelism approach to retrieving data may help to speed up performance of the data fetching cycle, this approach has limitations of its own. For example, cloud providers typically throttle, and restrict, the number of data calls that can be made within a given time period. Further, network bandwidth is a limited resource and having multiple simultaneous connections can put undue pressure on this resource.

Another challenge presented by considerations such as those noted above with regard to data fetching concern the load placed on the system by data calls. Particularly, a growing customer base, and a large number of cloud accounts in each of those customer account, may impose a huge load on the system in terms of the number of data calls that are made, and must be serviced.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to management of data collection. More particularly, at least some embodiments of the invention relate to systems, hardware, software, computer-readable media, and methods for efficient collection of data based on data access patterns. Embodiments of the invention may be particularly useful in environments in which services are provided by way of a cloud based platform, although no particular operating environment is required.

In general, example embodiments of the invention may operate to capture, for example, data concerning customer interaction patterns with services and systems, which may be cloud based, data change rates in the customer environment, and working time windows of the customer. These, and or other, data may be considered while deriving a time window and number of times data would be retrieved in a day for that customer. In this way, embodiments may avoid performing data retrievals for each customer in every cycle which, in turn, may help to reduce the load on the system, while also enabling more frequent data retrieval.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment may reduce the amount of data requested by, and transmitted to, a customer of a cloud service. An embodiment may take various factors into account, such as data access history, to generate a customer specific plan to reduce the number of data calls, and associated data transmission, while still providing customers with needed data.

A. Overview

Following is a brief discussion of some considerations that may arise in example operating environments for some embodiments of the invention. The first of these is that some customers may have multiple cloud accounts. Typical customers may be medium to large size organizations. Such customers may have multiple cloud accounts in a public cloud environment that are created and used by various business units/departments across the organization. Thus, the number of accounts associated with a single customer could run into multiples of 10s for medium size company to 100s for a large enterprise. In order for the customer to stay abreast of what is happening with its accounts, data may need to be gathered from all cloud accounts that the customer has configure within its management account, which may be the DellEMC CSM in some embodiments.

Another consideration relating to example operating environments concerns the possibility that a public cloud vendor may have to provide services over multiple geographical regions. In particular, public cloud vendors may support multiple regions spread across the globe. To illustrate, Amazon AWS (Amazon Web Services), one example of which is Amazon S3, supports 25+ regions, and Microsoft Azure supports 53 regions world-wide. These numbers continue to grow.

As well, management services such as CSM may support multiple resource and asset types, examples of which may include VMs, various types of data bases such as RDS, Aurora, DynamoDB, and Redshift on AWS, and object stores such as Blob Container on Azure. Again, this list of resources will keep growing as support is added for more resource types in future.

Still another consideration is that cloud based services typically have multiple customers. For example, CSM is a SaaS offering and thus has multi-tenancy support. Accordingly, CSM, and other services, must fetch data for each of its customers across all cloud accounts/regions/resource types.

Finally, in typical operating environments, services such as SaaS, VMs, and databases, for example, are hosted inside cloud datacenters. Thus, data responsive to customer data calls must be fetched from across the globe, that is, all various regions that the public cloud vendor supports. This involves communication over the internet and/or other networks which experience network issues such as latency, bandwidth shortfalls, and excess network loading.

When all these considerations are taken into account, it can be seen that retrieving data for each customer, and in every cycle, leads to longer time to complete the cycle and imposes higher loads on the system. At least some example embodiments are directed to an approach that addresses these and/or other considerations.

B. Aspects of an Example Architecture and Environment

The following is a discussion of aspects of example operating environments for various embodiments of the invention. This discussion is not intended to limit the scope of the invention, or the applicability of the embodiments, in any way.

Figure 1:
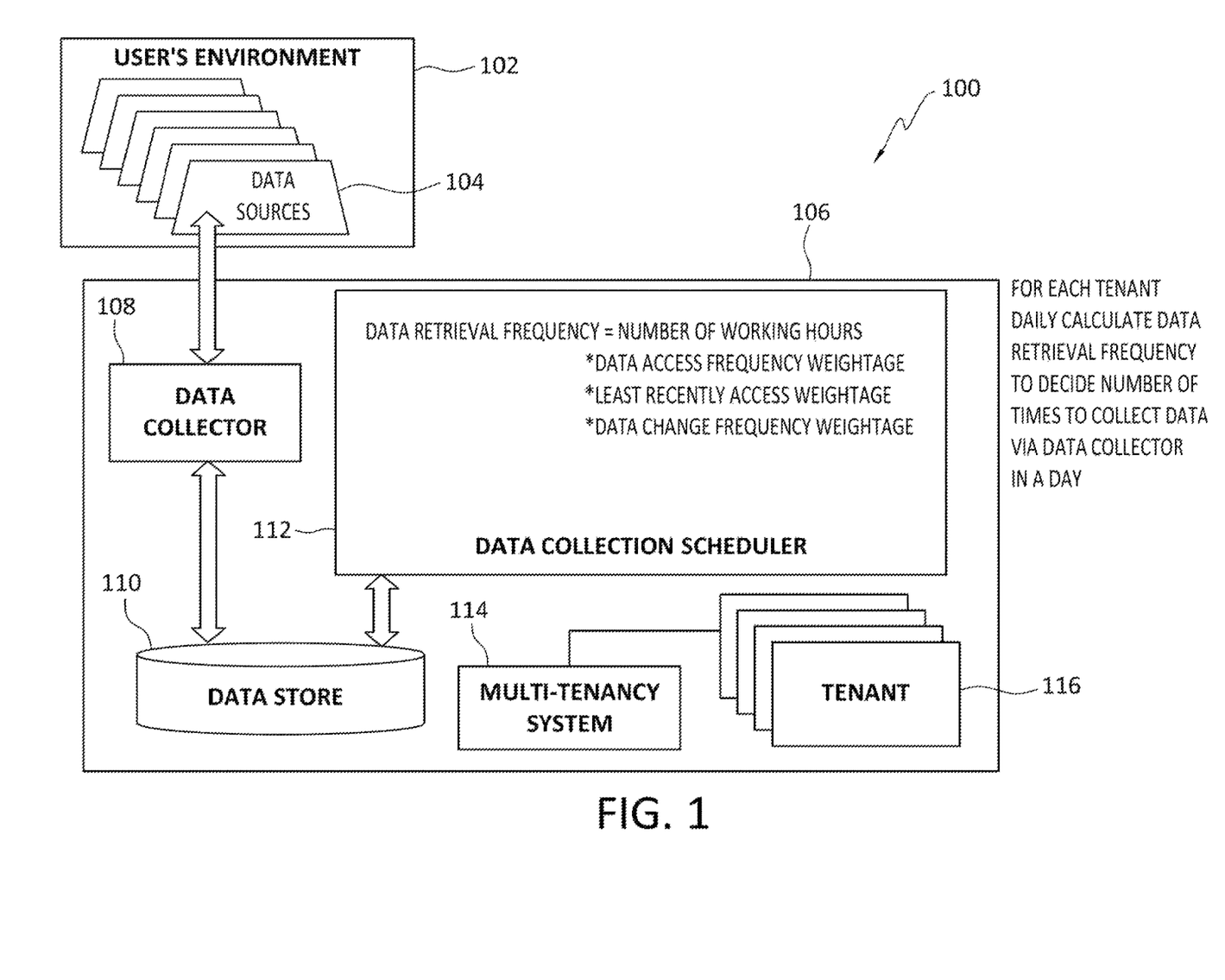
FIG. 1 discloses aspects of an example operating environment.

With reference now to FIG. 1, details are provided concerning aspects of an example environment 100 in connection with which one or more embodiments of the invention may be employed. One or more user environments 102 may be provided that may take various forms such as, for example, a premises of an enterprise or company, an edge computing site, or a cloud storage and/or computing site. The user environment 102 need not have any particular configuration. In at least some embodiments, the user environment 102 may comprise one or more data sources 104. Such data sources 104 may comprise, for example, databases, applications, VMs, or any other system, software, or device, configured to generate and/or store data of any kind.

Thus, as used herein, the term 'data' is intended to be broad in scope. That that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With continued reference to FIG. 1, the user environment 102 may communicate, wirelessly and/or by a hard connection such as an optical or copper cable for example, with a site 106, which may be a site remote from the user environment 102 and the site 106 may comprise a cloud site configured to provide cloud data storage services and/or cloud computing services, for example. A cloud site configured to provide cloud data storage services may host data storage applications and may include data storage systems. A cloud site configured to provide cloud computing services may comprise, for example, one or more VMs configured to perform functions that collectively define one or more services or applications. In some cases, the VMs may each implement one or more microservices of an application. Cloud site storage and/or computing services may, but are not required to, be provided to a user environment as a service, that is, Software as a Service (SaaS). VMs may also operate at a cloud site to perform operations related to data storage including, but not limited to, data storage, data backup, replication, cloning, data restore, and deduplication, for example. In general, any cloud function may be made available to a user environment 102 in the form of SaaS.

The user environment 102 may have multiple different accounts served by one or more sites 106. For example, the user environment 102 may have, or be associated with, a data storage account at the site 106, and a cloud computing account at the site 106.

The site 106 may include a data collector 108 configured to communicate directly, or indirectly, with the user environment 102. Among other things, the data collector 108 may direct particular data, from particular sources, to one or more data stores 110 at the site 106. Data may be stored at, and retrievable from, different data stores 110, or portions of a data store 110, based upon parameters such as, but not limited to, the type of data, and the source of the data.

A data collection scheduler 112 may be provided as part of the site 106. As discussed in more detail elsewhere herein, the data collection scheduler 112 may schedule data collection operations for a user environment 102 based upon, for example, historical data access patterns of the user environment 102. In general, the data collection scheduler 112 may instruct one or more data collectors to collect data from the user environment 102. The data collection scheduler 112 may then receive and process the collected data and store the processed data in a data store 110. On a request from a user, the data collector may provide the processed data to the user environment 102.

In some instances, and based upon data access patterns and/or other considerations, the data collection scheduler 112 may instruct the data store 110 to push data out to the user environment 102 according to a schedule. The data collection scheduler 112 may additionally, or alternatively, instruct the data store 110 to provide, such as in response to one or more requests or data calls from the user environment 102, data requested by the user environment 102, and the data thus provided may be received by the user environment 102 according to a schedule generated by the data collection scheduler 112.

Finally, the site 106 may include a multi-tenancy system 114 configured to support one or more tenants 116. Thus, embodiments of the invention may support applications, such as CSM or other SaaS for example, that must fetch data for one or more of its customers across all cloud accounts/ regions/resource types associated with each of those customers.

C. Aspects of Example Data Collection Methodologies

In general, at least some embodiments may operate to determine a 'Data Retrieval Frequency' (DRF), that is, the frequency at which data would be retrieved for a customer. The DRF may be determined considering various weightages as discussed below. Some embodiments may calculate a DRF based on any group of one or more data usage parameters, examples of which are discussed below.

The DRF may be determined automatically, and/or at the request of a user, and the user may be notified as to the DRF value, and a corresponding schedule when the customer can expect to receive requested data. The DRF may be automatically recalculated when a user adds and/or removes data, such as from a data store. The DRF may be recalculated periodically, such as every week or month for example, and/or ad hoc based on a user request, for example. As well, the DRF, and any recalculated DRF, may be set to take effect immediately, or upon the passage of a period of time, or upon the occurrence of a defined event, or non-occurrence of a defined event in a particular timeframe. Further, the DRF may be configured to take effect only if user data calls and/or the amount of data implicated by a data call increase, or decrease, by a particular amount, such as 5 percent for example. Any, or all, operations pertaining to a DRF, including generation of new/modified DRFs, may be performed by a data collection scheduler One parameter that may be considered when generating a DRF value is a Data Access Frequency based Weightage (DAFW), which reflects the fact that different customers may access their data at different respective frequencies. For example, Customer A may accesses its data 25 days in a month, while customer B accesses its data only 5 days in a month, while and still other customers are not accessing their data even once in a month. A data collection scheduler may have, or access, data indicating these access patterns. For example, CSM may collect and maintain data on data access patterns. Data access information may be leveraged to derive data retrieval frequency for a given customer account.

The DAFW may be calculated in various ways. CSM, for example, may have data about the number of days that customer data has been accessed in last 30 days. Different weightage may be assigned depending upon the number of days, as show in the illustrative example of Table I below. This is just one illustrative example. More generally, weightage values may be set as per environment/system where this is implemented. DAFW deduced from this may then be used in calculating DRF, as discussed elsewhere herein. The assigned example DAFW values may help in reducing the data retrieval load on the system by 25-50 percent, since not all customers access data every day.

TABLE I

| Number of Days data is accessed (n) - i.e., Data Access Frequency | Data Access Frequency Weightage |
|---|---|
| n >= 25 | 1 |
| 25 > n >= 20 | 0.80 |
| 20 > n >= 15 | 0.60 |
| 15 > n >= 10 | 0.40 |
| n < 10 | 0.20 |

Another parameter that may be considered in calculating a DRF value is the Least Recent Access based Weightage (LRAW). For example, two customers may have the same 'Data Access Frequency,' possibly both have accessed data 5 days out of the last 30, but one customer has accessed their data less recently than the other customer has accessed its day.

In more detail, consider that two customer accounts may have accessed data on 3 days out of the last 30 days, so those customers would have same Data Access Frequency (DAF). However, Customer A last accessed its data 25 days ago. On the other hand, Customer B accessed its data just 3 days ago. The customer who has accessed data least recently in the period of time extending back 30 days, that is, Customer A, may be given less weightage for data retrieval.

In terms of calculating LRAW, the system may collect data about the number of days that have passed since data was last accessed, such as during the last 30 days duration. A different weightage may be assigned depending upon the number of days, as show in the illustrative example of Table II below. Weightage values may be set as per environment/ system where this is implemented. LRAW deduced from this may then be used in calculating Data Retrieval Frequency.

TABLE II

| Number of Days since last data access (n) | Least Recent Access Weightage |
| --- | --- |
| 0 <= n < 5 | 1 |
| 5 <= n < 10 | 0.80 |
| 10 <= n < 15 | 0.60 |
| 15 <= n < 20 | 0.40 |
| n > 20 | 0.20 |

Yet another parameter that may be considered in calculating a DRF value is the Data Change Frequency based Weightage (DCFW). The state of a customer public cloud account may change with time, such as through creation of new resources and/or deletion of existing resources. The rate of change may vary from customer to customer, and even for a given customer may vary from cloud account to cloud account. Thus, 'Data Retrieval Frequency' may be relatively higher for a higher 'data change frequency' customer, and relatively lower for a lower 'data change frequency' customer. That is, a customer whose data changes frequently may have to make more data requests in order to stay up to date on its data, while a customer whose data changes relatively slowly may not need many data requests to stay apprised of the state of its data. In some embodiments, data change frequency may be calculated based on how many times in a month data changes are observed.

Data gathered by a system or platform, such as CSM for example, may be used to calculate Data Change Frequency Weightage (DCFW). For example, the system may collect data about the number of days in the past 30 days, for example, when customer data has changed. Different weightage may be assigned depending upon the number of change days, as show in the example Table III below. Weightage values may be set as per environment/system where this is implemented. DCFW deduced from this will then be used in calculating the Data Retrieval Frequency.

TABLE III

| Number of Days data has changed (n) | Data Change Frequency Weightage |
| --- | --- |
| n >= 25 | 1 |
| 25 > n >= 20 | 0.80 |
| 20 > n >= 15 | 0.60 |
| 15 > n >= 10 | 0.40 |
| n < 10 | 0.20 |

Finally, a DRF calculation may take into account a parameter concerning the number of working hours of customer. Particularly, data within a customer account may be accessed during the customer working hours window, and users within an account may reside in, or otherwise be associated with, a particular time zone. A system according to some example embodiments may be aware of the time zone, and the working hours, based on user or customer login information, and the physical location from where that user or customer accessed the data. Data retrieval may then be scheduled during working hours, and skipped or prevented during non-working hours.

In some cases, a site may have customers spread across the globe, such that the effective working window, from an overall site perspective, is 24 hours per day. With this expanded working window, the data transfer load on the system may be reduced, since not all customers have the same working hours during which data is transferred. It commonly occurs that that a working window has a size of about 8-10 hours, including breaks. For the purposes of illustration however, it will be assumed that one example working window is 12 hours.

D. Example Data Retrieval Frequency (DRF) Calculations

Using the example parameters discussed above, a DRF may be calculated using the formula:

DRF=Number of working hours×DAFW×LRAW×DCFW

The following example is illustrative.

Assume that, for an example customer account, data is being accessed 20 days in a month, the last time data was accessed was 2 days ago, and data changes were observed on 20 days of last 30 days. Given a 12 hour working window, and taking example respective weightages from Tables I, II, and II, the DRF would be calculated as:

DRF=12×0.8×1×0.8=7.68 (may be rounded to 8).

Thus, for this example customer, the DRF would be 8 and, accordingly, data for this customer would be retrieved and sent to the customer 8 times in each successive 12 hour work window, or 16 times in a 24 hour period. Note that the 8 retrieval times may, or may not, be evenly spaced throughout the 12 hour period.

It is noted that embodiments of the invention, whether claimed or not, cannot be performed, practically or otherwise, in the mind of a human. As indicated by the illustrative examples disclosed herein, embodiments of the invention are applicable to, and find practical usage in, complex and dynamic environments. Such environments may include hundreds, thousands, or tens of thousands of customers, or more. Each of the customers may have multiple different cloud accounts hosted at locations around the world, in multiple different time zones. Each of the customer accounts may involve the storage and usage of large amounts of data, terabytes or even petabytes in some cases. As well, some accounts may involve the usage of tens, hundreds, thousands, or tens of thousands, or more, of VMs at a site such as a cloud computing site or cloud storage site. Moreover, data may be added and removed from customer accounts 24 hours a day. Finally, DRFs may be recalculated and implemented on an ongoing basis for the customers of a site.

Given considerations such as these, which are presented by way of example and not limitation, it is clear that gathering data usage information, and then calculating and implementing DRFs based on the usage information in such complex and dynamic environments is well beyond the mental capabilities of any human to perform practically, or otherwise. Thus, while other, simplistic, examples are disclosed herein, those are only for the purpose of illustration and to simplify the discussion, but do not represent real world applications of embodiments of the invention. Accordingly, nothing herein should be construed as teaching or suggesting that any aspect of any embodiment of the invention could or would be performed, practically or otherwise, in the mind of a human.

As is apparent, embodiments of the invention may have a wide range of business applicability. Among other things, embodiments may help to level, and/or reduce, a data transmission load imposed by customers on a site. This, in turn, may provide various benefits. For example, customers may have more will have more real time data reported. As another example, embodiments may provide a scalable solution as load on the system may not increase in direct proportion to an increase in the number of customers accessing data from the system. Embodiments of the invention may also provide reports and dashboard data to one or more customers on various bases including, per account, per customer, per time frame, and per data type. Embodiments of the invention may be implemented in connection with the DellEMC Cloud Snapshot Manager, although that is not required.

E. Example Methods

Figure 2:
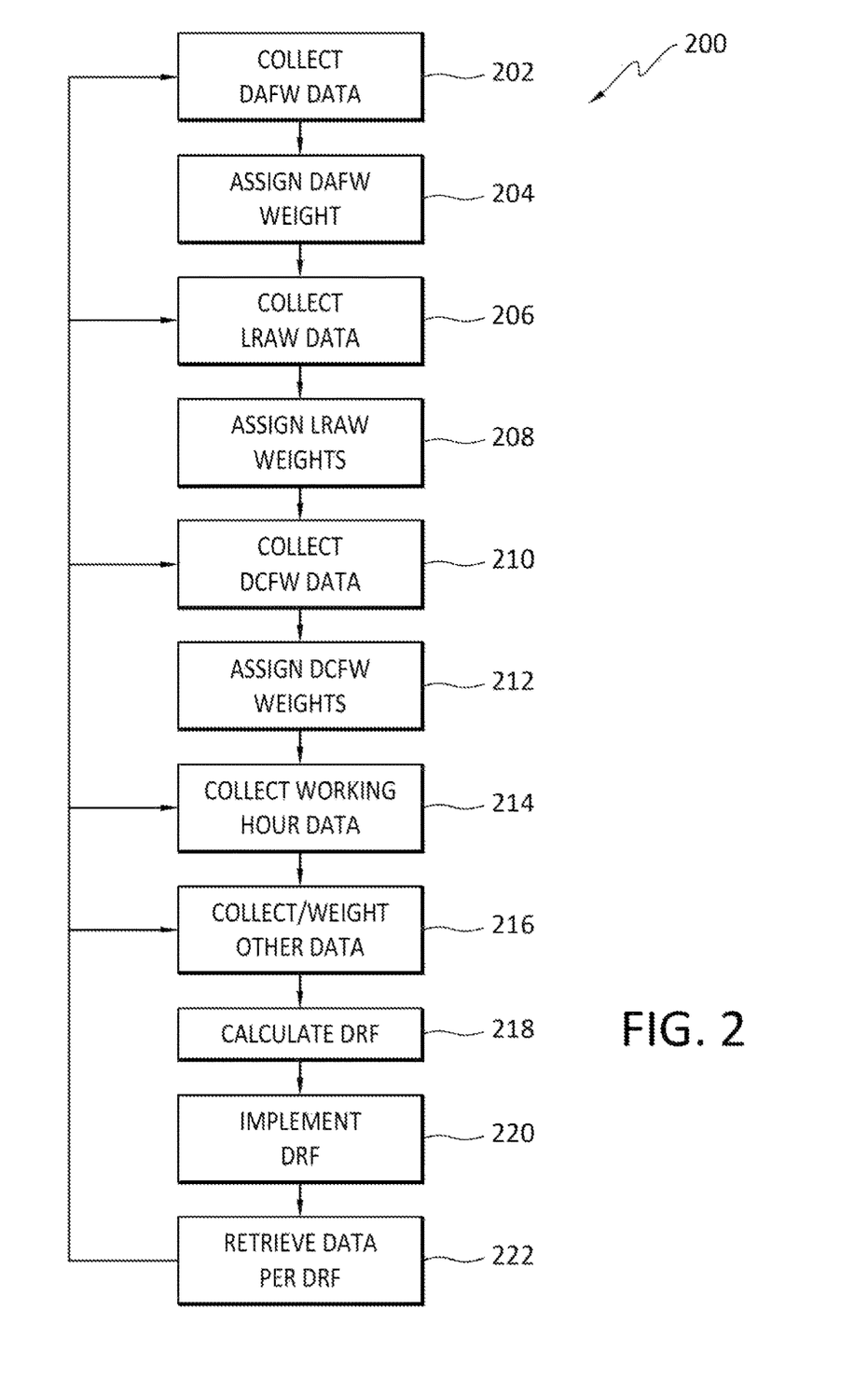
FIG. 2 discloses aspects of an example method for data collection.

It is noted with respect to the example method of FIG. 2 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 2, an example method 200 is disclosed. The method 200 may be performed in whole, or in part, such as at a data storage site accessible by one or more customers. The method 200 may begin with the collection 202 and weighting 204 of DAFW data. Next, LRAW data may be collected 206 and weighted 208. DCFW data may then be collected 210 and weighted 212.

Note that the order of processes in the method 200 may be varied. For example, DAFW data, LRAW data, and DCFW data, may be collected in any order relative to each other. As well, one or more processes of the method 200 may be omitted. For example, and depending upon the embodiment, collection of any of DAFW data, LRAW data, and DCFW may be omitted, and a DRF calculated without the omitted information.

With continued reference to FIG. 2, working hour data may be collected as well 214. In some instances, working hour data may be specified, such as with a default value, rather than being collected.

DAFW data, LRAW data, and DCFW data are presented by way of example. Thus, in some embodiments, other data may additionally, or alternatively, be collected and weighted 216.

Once the various data has been collected, the DRF may be calculated 218, and implemented 220. Data retrieval may then be governed 222 per the requirements of the DRF.

As further indicated in FIG. 2, part or all of the method 200 may be performed recursively and/or continuously. For example, even after a DRF has been calculated 218 and implemented 220, and data retrieved per the DRF 222, additional data may continue to be collected and weighted.

In this way, the DRF may be automatically updated as needed to suit changing conditions in the system.

E. Further Example Embodiments

Following are some further example embodiments of the invention. These are presented only by way of example and are not intended to limit the scope of the invention in any way.

Embodiment 1. A method, comprising: collecting information concerning respective data access patterns of one or more customers; using the information, and work window information, to calculate a respective data retrieval frequency for each of the customers; and enabling the customers to retrieve data according to their respective data retrieval frequency.

Embodiment 2. The method as recited in embodiment 1, wherein the method is performed by a data collection scheduler that operates in a multi tenancy environment that supports the data requirements of all of the customers.

Embodiment 3. The method as recited in any of embodiments 1-2, further comprising weighting the collected information, and weighting information is used in calculation of the data retrieval frequencies.

Embodiment 4. The method as recited in any of embodiments 1-3, wherein one of the data retrieval frequencies is recalculated automatically based on changes to data of the customer to which that data retrieval frequency applies.

Embodiment 5. The method as recited in any of embodiments 1-4, wherein the collected information comprises data access frequency information.

Embodiment 6. The method as recited in any of embodiments 1-5, wherein the collected information comprises information about least recently accessed data.

Embodiment 7. The method as recited in any of embodiments 1-6, wherein the collected information comprises data change frequency information.

Embodiment 8. The method as recited in any of embodiments 1-7, wherein the DRF for one of the customers is calculated using the formula: DRF=Number of working hours×weighted data access frequency×weighted least recently accessed data×weighted data change frequency.

Embodiment 9. A method for performing any of the operations, methods, or processes, or any portion of any of these, disclosed herein.

Embodiment 10. A non-transitory storage medium having stored therein instructions that are executable by one or more hardware processors to perform operations comprising the operations of any one or more of embodiments 1 through 9.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
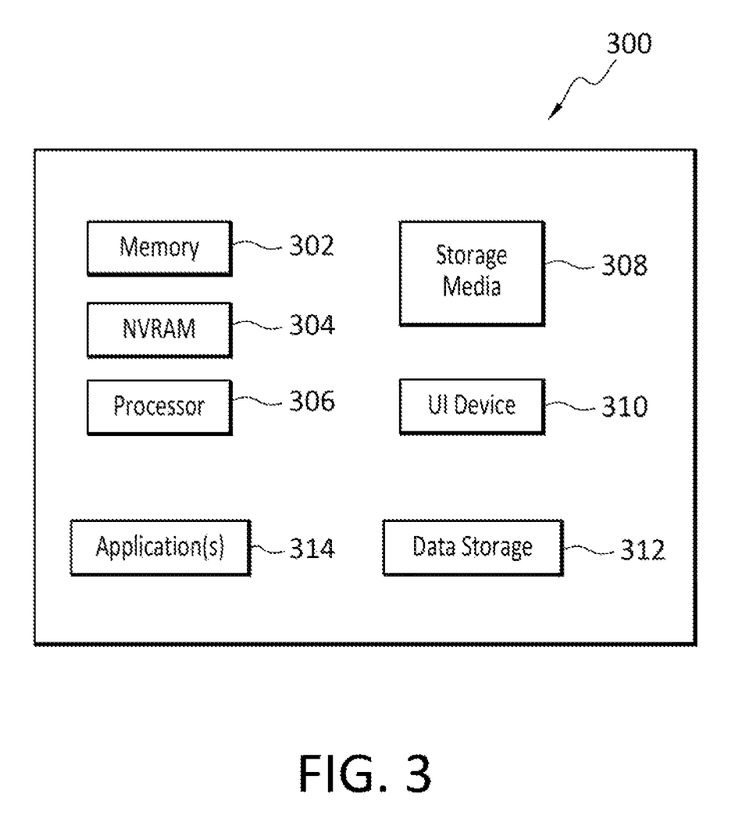
FIG. 3 discloses aspects of an example computing entity configured to perform any of the disclosed methods and processes.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving a data access history of one or more customers;

collecting, by a computing entity that comprises a data collector, information concerning respective data access patterns of the one or more customers based on the data access history;

deriving work window information based on the data access history;

using the information, and the work window information, to calculate, by a computing entity that comprises a data collection scheduler, a respective data retrieval frequency (DRF) for each of the customers, wherein the DRF for one of the customers is calculated using the formula:

DRF=Number of working hours×weighted data access frequency×weighted least recently accessed data×weighted data change frequency;
and enabling the customers to retrieve data according to their respective data retrieval frequency.

2. The method as recited in claim 1, wherein the data collection scheduler operates in a multi tenancy environment that supports the data requirements of all of the customers.

3. The method as recited in claim 1, further comprising weighting the collected information, and weighting information is used in calculation of the data retrieval frequencies.

4. The method as recited in claim 1, wherein one of the data retrieval frequencies is recalculated automatically based on changes to data of the customer to which that data retrieval frequency applies.

5. The method as recited in claim 1, wherein the collected information comprises data access frequency information.

6. The method as recited in claim 1, wherein the collected information comprises information about least recently accessed data.

7. The method as recited in claim 1, wherein the collected information comprises data change frequency information.

8. A non-transitory storage medium having stored therein instructions that are executable by one or more hardware processors to perform operations comprising:

receiving a data access history of one or more customers;

collecting, by a computing entity that comprises a data collector, information concerning respective data access patterns of the one or more customers based on the data access history;

deriving work window information based on the data access history;

using the information, and the work window information, to calculate, by a computing entity that comprises a data collection scheduler, a respective data retrieval frequency (DRF) for each of the customers, wherein the DRF for one of the customers is calculated using the formula:

$$DRF = \text{Number of working hours} \times \text{weighted data access frequency} \times \text{weighted least recently accessed data} \times \text{weighted data change frequency};$$
  and enabling the customers to retrieve data according to their respective data retrieval frequency.

9. The non-transitory storage medium as recited in claim 8, wherein the data collection scheduler operates in a multi tenancy environment that supports the data requirements of all of the customers.

10. The non-transitory storage medium as recited in claim 8, further comprising weighting the collected information, and weighting information is used in calculation of the data retrieval frequencies.

11. The non-transitory storage medium as recited in claim 8, wherein one of the data retrieval frequencies is recalculated automatically based on changes to data of the customer to which that data retrieval frequency applies.

12. The non-transitory storage medium as recited in claim 8, wherein the collected information comprises data access frequency information.

13. The non-transitory storage medium as recited in claim 8, wherein the collected information comprises information about least recently accessed data.

14. The non-transitory storage medium as recited in claim 8, wherein the collected information comprises data change frequency information.

15. A system, comprising:

one or more hardware processors; and a non-transitory storage medium having stored therein instructions that are executable by the one or more hardware processors to perform operations comprising:

receiving a data access history of one or more customers;

collecting, by a computing entity that comprises a data collector, information concerning respective data access patterns of the one or more customers based on the data access history;

deriving work window information based on the data access history;

using the information, and work window information, to calculate, by a data collection scheduler, a respective data retrieval frequency (DRF) for each of the customers, wherein the DRF for one of the customers is calculated using the formula:

$$DRF = \text{Number of working hours} \times \text{weighted data access frequency} \times \text{weighted least recently accessed data} \times \text{weighted data change frequency};$$
  and enabling the customers to retrieve data according to their respective data retrieval frequency.

16. The system as recited in claim 15, wherein one of the data retrieval frequencies is recalculated automatically based on changes to data of the customer to which that data retrieval frequency applies.

17. The system as recited in claim 15, further comprising weighting the collected information, and weighting information is used in calculation of the data retrieval frequencies.

* * * * *